United States Patent [19]

Parke et al.

[11] 4,074,176
[45] Feb. 14, 1978

[54] MOTOR PROTECTOR

[75] Inventors: Harry G. Parke, Brooklyn; Harry W. Tomsky, Bronx, both of N.Y.

[73] Assignee: Marine Electric Corporation, Brooklyn, N.Y.

[21] Appl. No.: 693,483

[22] Filed: June 7, 1976

[51] Int. Cl.² ........................................... H02P 3/26
[52] U.S. Cl. ................................. 318/371; 318/370
[58] Field of Search ............... 318/209, 210, 211, 370, 318/371, 372, 383, 86

[56] References Cited

U.S. PATENT DOCUMENTS

| 3,038,109 | 6/1962 | Mowery | 318/211 |
| 3,582,741 | 1/1969 | Arnold | 318/371 |

*Primary Examiner*—Robert K. Schaefer
*Assistant Examiner*—Leonard W. Pojunas
*Attorney, Agent, or Firm*—Wender, Murase & White

[57] ABSTRACT

Apparatus for preventing overvoltage and overcurrent damage to direct current motors, and wheel lockout in electrically powered vehicles having dynamic and mechanical brake assemblies includes dynamic braking voltage and current sensing circuits, a first network responsive to detected dynamic braking voltages exceeding a predetermined value, a second network responsive to dynamic braking currents exceeding a predetermined level, and a third network responsive to dynamic braking current exceeding a different predetermined level at the same time that excessive mechanical braking occurs and for providing an output when such conditions coexist for more than a predetermined time period, and an interrupting circuit responsive to outputs from the first, second, and third networks for interrupting dynamic braking and substituting therefor mechanical braking.

27 Claims, 1 Drawing Figure

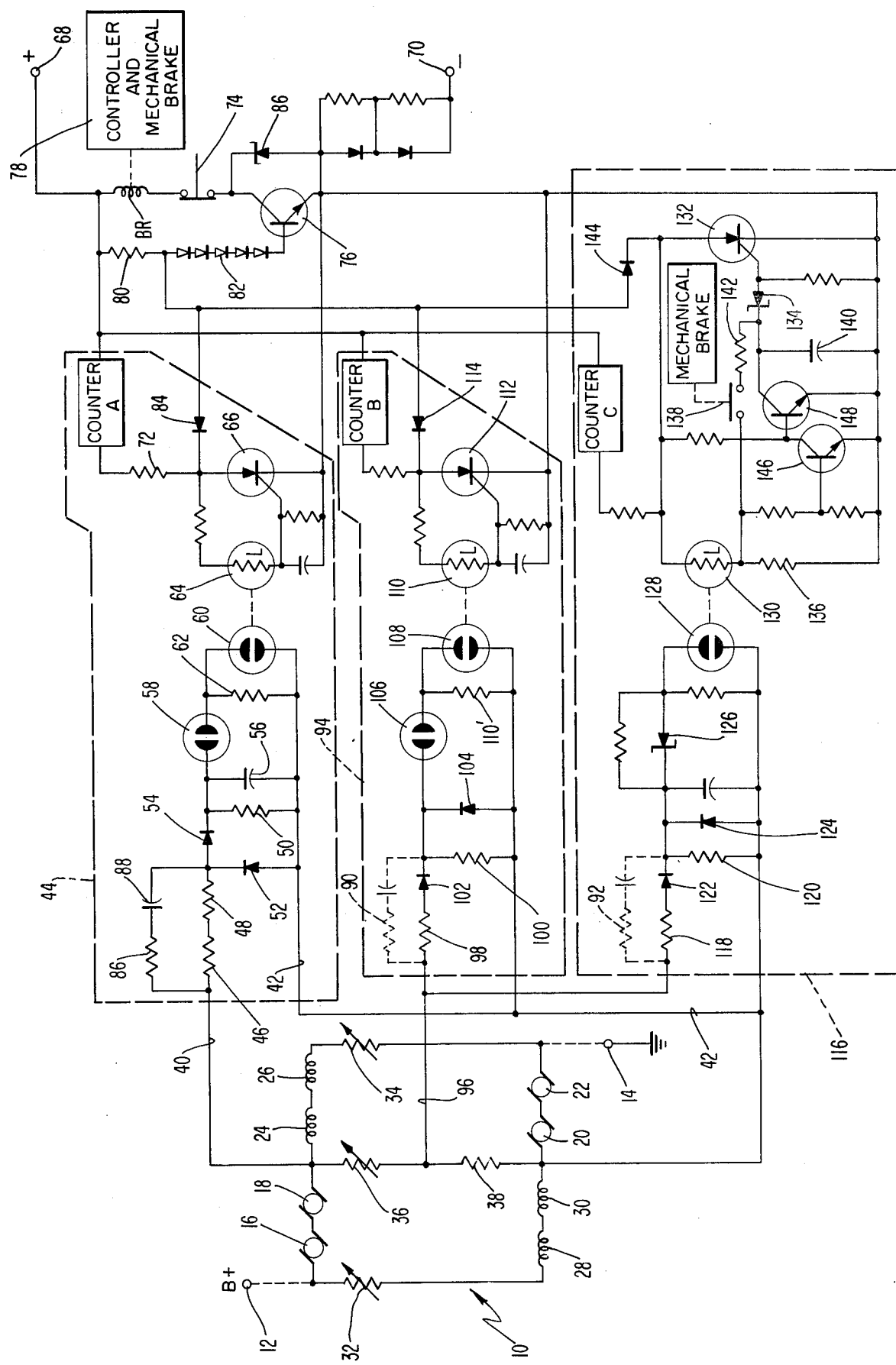

MOTOR PROTECTOR

BACKGROUND OF THE INVENTION

1. Field of the Invention:

The present invention relates to motor protection circuits for direct current motors, and more particularly, to such circuits in which dynamic braking voltages and dynamic braking currents which exceed predetermined safe levels are precluded while at the same time the application of dynamic and mechanical braking simultaneously for more than a preset time interval is avoided.

2. Description of the Prior Art:

Direct current motors, and in particular those which are used to power vehicles of various types, such as trains, cars and trucks, and in operating elevators, winches and other machinery, are subject to severe mechanical damage if improperly operated during those periods of time when dynamic braking is applied. During such dynamic braking, when the motor is acting as a generator and is absorbing energy from the kinetic energy of the moving load and dissipating it in resistors, excessive voltages and/or currents may be generated. Through improper use of the motor control mechanism, these excessive voltages and/or currents may reach and exceed levels at which electric arcs are drawn between various parts of the motor and/or the frame, melting metal and destroying insulation. These electric arcs, commonly known as flashover, can produce serious damage requiring extensive and costly repairs and loss of effective operating time.

The prior art, as exemplified by U.S. Pat. Nos. 2,656,501, 2,926,759, and 2,933,350, is generally cognizant of systems which automatically regulate the application of dynamic and mechanical or electro-pneumatic braking systems so as to achieve a smooth and efficient overall braking characteristic while at the same time preventing damage to system components. While these systems are generally effective in achieving desired braking characteristics, the flashover problem continues to exist and in many situations excessive voltages and/or currents are permitted to develop beyond the limits which can be tolerated.

A related problem has also been recognized in the prior art with respect to the common or simultaneous actuation of dynamic and mechanical braking systems for excessively long periods of time. In connection with rapid transit systems, for instance, under normal braking operation the mechanical brakes should be applied only when the train speed has slowed to the point that dynamic braking will soon become ineffective. When both mechanical and dynamic braking systems are simultaneously applied while the train is travelling at relative high speed, the wheels can lock and slide resulting in the production of flat spots.

The tendency to exhibit wheel locking and the damaging flashover which can occur by improper application of dynamic braking are substantial disadvantages which have long plagued systems conventionally used in the past.

SUMMARY OF THE INVENTION

It is, therefore, an object of the present invention to detect excessive voltages and currents in electric motors during periods of dynamic braking, and in response thereto to substitute mechanical braking thereby avoiding flashover damage.

Another object of the present invention is to detect, record and correct conditions of simultaneous application of dynamic and mechanical braking systems for more than a predetermined time interval to prevent damage. It is a further object of this invention to detect conditions which exist in high power circuits and to couple such detected information to control circuits for damage prevention, while at the same time providing total electrical isolation between the power and control circuits.

The invention may be summarized as apparatus for preventing damage to an electric motor during dynamic braking which includes a circuit for detecting dynamic brake voltage, a network responsive to the detected dynamic brake voltage for generating an output whenever the voltage exceeds a predetermined value, and a circuit responsive to the output of the voltage responsive network for interrupting dynamic braking and substituting mechanical braking therefor whereby damage to the motor by excessive dynamic braking voltages may be prevented. The invention further contemplates similar circuitry for detecting and responding to overcurrent conditions which develop during dynamic braking, and additional circuitry for substituting mechanical braking for dynamic braking whenever the two braking systems are simultaneously applied for more than a preset length of time.

The invention exhibits a number of material advantages over the prior art in that flashover in DC electric motors caused by either excessive voltages or excessive currents during dynamic braking is eliminated, that wheel locking and attendant damage caused by simultaneous application of dynamic and mechanical braking assemblies is avoided, and that information relating to operating conditions existing in high voltage power circuits is transmitted to low voltage control circuits with complete isolation therebetween.

Other objects and advantages of the present invention will become apparent from the following description of the preferred embodiment when taken in conjunction with the accompanying drawing.

BRIEF DESCRIPTION OF THE DRAWING

The FIGURE is a schematic diagram of a preferred embodiment of the motor protector according to the present invention.

DESCRIPTION OF THE PREFERRED EMBODIMENT

Referring to the FIGURE, a motor circuit 10 as might be used, for example, in a rapid transit system, is designed to be operated from a source of high power operating potential, represented by positive terminal 12. Source 12 is typically 600 volts DC at several hundred amperes, and is returned to ground at terminal 14. During dynamic braking the motors are disconnected from the power terminals as shown by the dashed lines diagrammatically connecting the motor circuit 10 to terminals 12 and 14. The motor circuit 10 includes four traction motor armatures 16, 18, 20 and 22. When used in a rapid transit system, armatures 16 and 18 may be associated with one truck while armatures 20 and 22 are on the other. Field windings 24, 26, 28 and 30 are associated with armatures 16 through 22, respectively, with the armatures and field windings of each associated pair connected in series, as shown.

Each of the series branches is connected at their respective terminal ends by variable resistors 32 and 34. A similar variable resistor 36, connected in series with a fixed resistor 38, interconnects the midpoints of the series legs to complete the circuit 10, as illustrated. Resistors 32, 34 and 36 are adjustable resistors which are controlled to govern dynamic braking by a controller (not shown) of any suitable type. In operation, the controller increases the amount of dynamic braking by decreasing resistors 32, 34 and 36. Should the controller misoperate and cause the resistances of resistors 32, 34 and 36 to reach too low a value for the speed at which the motor is operating, excessive field current will flow which will generate high armature voltages. If the voltage levels during these intervals exceed a critical value, typically about 2,000 volts per pair of motors in a 600 volt system, flashover and attendant damage will result.

If the controller misoperates at low speeds, the voltage levels will not rise to the flashover point, but excessive current will flow, possibly causing flashover or damaging resistors 32 through 38. Also, such misoperation may have the result of excessively slowing wheel rotation while the train is still moving forward, possibly locking the wheels and causing a flat spot by sliding.

In order to avoid the above described damaging conditions, the present invention detects and monitors dynamic brake voltage and current levels and substitutes mechanical braking for dynamic braking when dangerous levels of operation occur.

Referring again to the FIGURE, the most direct way to sense overvoltage would be to use connections directly across each pair of motors 16–18 and 20–22. Since in modern rapid transit cars, series motors with low field resistances are generally used, and since modern control circuits include variable resistors 32 and 34 which have values generally much less than resistors 36 and 38, a good indication of output voltage of all of the motors in the system may be obtained by connecting a pair of leads 40 and 42 across the series connection of resistors 36 and 38, as shown. While this connection is preferred, it should be appreciated that direct connections across motor pairs 16–18 and 20–22 could be substituted, if desired.

Leads 40 and 42 feed dynamic brake voltage information to an overvoltage monitoring network 44 which has, at an input, a voltage divider consisting of resistors 46, 48 and 50. Preferably, resistors 46 and 48 are disposed as near as possible to the motors to minimize the length of cable that might carry heavy power currents in the event of malfunction. Diodes 52 and 54 prevent the development of reverse voltages across resistor 50, and capacitor 56 filters out high frequency pick-up. A first neon lamp 58 is connected in series with a second neon lamp 60, the latter being connected in parallel with a resistor 62. The lamps are connected across resistor 50 of the input voltage divider and are responsive to the detected or sensed voltage signal. If the voltage across resistor 50 rises to a high enough value to break down neon lamp 58, typically 220 volts, lamp 58 will maintain only its conducting voltage, with the difference appearing across resistor 62 and neon lamp 60. This causes lamp 60 to fire and become illuminated.

Lamp 60 is disposed within optical proximity of a photoresistor 64. Preferably, lamp 60 and photoresistor 64 are mounted in a light shielded assembly so that resistor 64 responds only to light from lamp 60. As such, lamp 60 and photoresistor 64 form an optical coupler which transfers the light signal representing an overvoltage condition while at the same time maintaining total electrical isolation.

When lamp 60 is dark, photoresistor 64 is nearly an open circuit; however, when the lamp becomes illuminated, the resistance of device 64 quickly drops to a few hundred ohms thereby delivering current to the gate of an SCR 66 from the anode thereof. This causes the SCR 66 to conduct current from a source of control potential, represented by terminals 68 and 70 through the electromagnetic coil of a counter A and a series connected resistor 72. Again, using the example of a rapid transit system, control source 68–70 typically may be a 37.5 volt DC source. By connecting the anode-cathode path of SCR 66 in series with the coil of counter A across the control voltage source, each time SCR 66 fires, an additional count will be accumulated so that a permanent record will be maintained of the number of times an overvoltage condition has been experienced.

A brake relay coil BR is connected in series with a normally closed emergency switch 74 and the collector-emitter path of a transistor 76 across source 68–70. Relay coil BR may be of any conventional type such as that used on modern rapid transit cars and is connected to the controller and mechanical brake assemblies, indicated schematically by block 78. When relay coil BR is energized, it acts to hold off the mechanical or air brakes and permits normal dynamic brake operation. When deenergized, it applies the mechanical brakes and effectively removes dynamic braking usually by increasing the resistances of control resistors 32, 34 and 36 to their maximum values independently of the controller that normally governs them. Generally, relay BR is excited from source 68–70, which supplies operating potential during the braking cycle and is turned off when the throttle is in the off position. Thus, during normal braking operation, relay coil BR will be energized by the collector current of transistor 76, the base current of which is derived from source 68–70 through resistor 800 and the diode series network 82.

A diode 84 is connected between the anode of SCR 66 and the junction of resistor 80 and diode network 82. In this manner, when SCR 66 fires, the current through resistor 80 is drained off, preventing base current from flowing through network 82 to transistor 76 which is thereby turned off. With transistor 76 off, brake relay BR is de-energized whereupon dynamic braking will be interrupted and mechanical brakes substituted therefor. Zener diode 86 will limit the voltage at the collector of transistor 76 to a safe value.

In operation, during dynamic braking conditions, whenever the potential across resistors 36 and 38 reaches an excessive level, the divided potential across resistor 50 of network 44 will be sufficiently great to cause neon lamp 58 to fire. Firing of lamp 58, in turn, causes neon lamp 60 to become energized thereby producing a rapid drop in the resistance of photoresistor 64. With the photoresistor 64 at a low resistance, SCR 66 is fired causing current to be drawn off through diode 84 so as to render transistor 76 nonconductive. Relay coil BR thus drops out and substitutes mechanical braking for dynamic braking. As a result, the dangerously high overvoltage conditions which would otherwise cause damaging flashover are eliminated before any breakdown occurs. The above sequence is also recorded by counter A which stores a total count of the number of malfunctions which have resulted in the drop-out of relay BR.

While various different types of sensors and coupling networks may be utilized in accordance with the present invention, the network described above, including the optical isolation provided by lamp 60 and photoresistor 64, is preferred for its simplicity and total electrical isolation between high and low voltage circuits. In addition, it has been found that the brake relays on modern rapid transit vehicles operate rapidly enough that the circuitry shown will reliably prevent voltage flashover and similar damage. For a slow release brake relay BR, an anticipation circuit consisting of a resistor 86 and a capacitor 88 connected together in series across resistors 46 and 48 can be used. Resistor and capacitor 86 and 88 cooperate to make the network 44 firing-rate-sensitive, i.e., the neon lamp 58 will fire whenever the rate of increase of the dynamic brake voltage exceeds a predetermined rate and is approaching the breakdown potential of lamp 58. As will be appreciated below, similar anticipation circuits 90 and 92 may be used with the remaining networks in like manner.

The present invention also includes a dynamic brake current detector network 94. Network 94 is similar to network 44 and receives current information from lines 96 and 42 which are connected across resistor 38. Resistor 38 preferably is a one ohm resistor so that the voltage measured across the resistor equals the current flowing therethrough. Lines 96 and 42 are fed to a voltage divider consisting of resistors 98 and 100, and diodes 102 and 104 prevent reverse voltages from operating the circuit. Neon lamp 106 is connected in series with a neon light source 108 having a resistor 110 connected in parallel, with the series connected lamps connected across resistor 100 of the input voltage divider.

The light from lamp 108 is optically coupled to photoresistor 110 which is coupled to the gate of SCR 112 in a manner similar to network 44. A counter B records the number of overcurrent conditions detected by network 94, and a diode 114 is coupled between the anode of SCR 112 and the junction of resistor 80 and diode network 82 so as to cause relay BR to drop out in an overcurrent condition.

Preferably, when the circuit according to the present invention is utilized in association with rapid transit systems, component values are selected such that voltage detector network 44 will cause brake coil BR to drop out when the dynamic brake voltage per motor pair exceeds 1900 volts. Overcurrent network 94 is likewise preferably preset to release coil BR when currents in excess of 400 amperes are sensed. Obviously, the component values may be adjusted or preselected so as to respond to any number of various voltage and current levels, the exact values of which will be determined in relation to the overall motor configuration and desired braking characteristic.

A third network 116 prevents the simultaneous application of dynamic and mechanical braking systems for excessive periods of time. Input resistors 118 and 120 act as a voltage divider, with diodes 122 and 124 used to prevent reverse voltage operation. Since network 116 operates at normal rather than extreme conditions, lower voltage sensitivity is required and a Zener diode 126 is used rather than a neon bulb. A neon light source 128 is connected in series with the Zener diode 126 across resistor 120 of the voltage divider so as to respond to input signals. These signals are derived via lines 96 and 42 from across resistor 38 and thus represent dynamic brake current. Preferably, light source 128 will be energized whenever dynamic brake current is approximately 200 amperes or more.

Lamp 128 is optically coupled to photoresistor 130 such that when the lamp is energized, resistor 130 drops to a low value and a voltage sufficient to trigger an SCR 132 through Zener diode 134 will be present across resistor 136. This voltage, however, will be held off by the open contacts of a pressure switch 138 which is operated by the pressure existing in the mechanical brake system. When the mechanical brake pressure exceeds a set point, switch 138 will be closed, and the potential across resistor 136 will be applied to capacitor 140 causing the same to charge through resistor 142. When the voltage across capacitor 140 reaches a level sufficient to fire SCR 132, the SCR will become conductive and will drain current through diode 144 thereby causing relay BR to again drop out. As before, a counter C records these events and maintains a record thereof for future reference.

The time delay provided by capacitor 140 and resistor 142 is necessary in order to allow both dynamic and mechanical braking systems to "blend" for a few tenths of a second during normal stopping. The time delay thus precludes drop out of coil BR until after the normal "blending" interval has transpired.

The present invention also provides for rapid discharge of capacitor 140. Whenever a voltage appears across resistor 136, i.e., during those intervals when dynamic brake current exceeds the preset value, a transistor 146 will be held on by base currents through its input resistance network. With transistor 146 on, transistor 148, which has its base-emitter junction coupled in parallel with the collector-emitter path of transistor 146, is held open. The collector-emitter path of transistor 148 is coupled across capacitor 140. Thus, whenever a potential appears across resistor 136, transistor 148 will be open and capacitor will be allowed to charge. When the current drops, however, the voltage across resistor 136 drops, transistor 146 becomes open, and transistor 148 becomes conductive to discharge the capacitor completely.

After one or more of the SCR devices 66, 112 and 132 have fired, they will be automatically turned off and the system reset whenever the throttle is returned to the off position, since this removes the control potential from terminals 68–70.

From the foregoing, it can be appreciated that the present invention enables the simple, yet effective monitoring of excessive voltages and currents occurring during dynamic braking, and automatically substitutes mechanical braking during such detected fault conditions so as to prevent flashover and its attendant damage. The present invention also monitors the simultaneous application of dynamic braking and mechanical braking systems for excessive periods of time and, again, effectively removes the dynamic braking before damage occurs. All of these operations are recorded by separate counters to assist in evaluating overall system performance. The circuits according to the present invention utilize low maintenance solid state components and provide optical coupling between high and low power portions of the networks to assure total electrical isolation.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. Apparatus for preventing damage to an electric motor during dynamic braking comprising:
   sensing means for electrically detecting dynamic brake voltage of the electric motor;
   means responsive to said detected dynamic brake voltage for generating an output whenever said voltage exceeds a predetermined value; and
   means responsive to the output of said voltage responsive means for interrupting dynamic braking and substituting mechanical braking therefor whereby damage to the motor by excessive dynamic braking voltages may be prevented.

2. Apparatus as recited in claim 1 further including recording means connected with said interrupting means for recording interruptions of said dynamic braking.

3. Apparatus as recited in claim 2 wherein said recording means comprises a counter.

4. Apparatus as recited in claim 1 wherein said voltage responsive means includes anticipation circuit means causing the generation of said output whenever the rate of increase of said voltage is above a predetermined rate and the value thereof is approaching said predetermined value.

5. Apparatus as recited in claim 1 wherein said output is a light signal; and wherein said voltage responsive means comprises a voltage breakdown device coupled to said sensing means, and a source of light; said light source being connected to said voltage breakdown device to generate said light signal in response to operation of said voltage breakdown device whenever said detected dynamic brake voltage exceeds said predetermined value.

6. Apparatus as recited in claim 5 wherein said interrupting means comprises a light responsive device disposed within optical proximity of said light source, and a semiconductor switch coupled with said light responsive device for assumming a first conductive state in the absence of light from said source and a second conductive state in the presence of light from said source.

7. Apparatus as recited in claim 1 further including:
   second sensing means for electrically detecting dynamic brake current of the electric motor; and
   means responsive to said detected dynamic brake current for generating a second output whenever said current exceeds a predetermined level;
   said interrupting means being further coupled with said current responsive means and responsive to said second output for interrupting dynamic braking and substituting mechanical braking therefor.

8. Apparatus as recited in claim 7 further including:
   second means responsive to said detected dynamic brake current for generating an electrical signal whenever said current exceeds a second predetermined level;
   means responsive to mechanical brake pressure exceeding a preset value for assuming an actuated state; and
   means coupled to said second current responsive means and said brake pressure responsive means for generating a third output whenever the electrical signal from said second current responsive means and the actuated state of said brake pressure responsive means coexist for more than a preselected length of time;
   said interrupting means being further coupled with said third output generating means and being further responsive to said third output whereby simultaneous application of dynamic and mechanical braking beyond said preselected length of time is prevented.

9. Apparatus as recited in claim 1 further including:
   second sensing means for electrically detecting dynamic brake current of the electric motor;
   means responsive to said detected dynamic brake current for generating an electrical signal whenever said current exceeds a predetermined level;
   means responsive to mechanical brake pressure exceeding a preset value for assuming an actuated state; and
   means coupled to said current responsive means and said brake pressure responsive means for generating a second output whenever the electrical signal from said current responsive means and the actuated state of said brake pressure responsive means coexist for more than a preselected length of time;
   said interrupting means being further coupled with said second output generating means and being further responsive to said second output whereby simultaneous application of dynamic and mechanical braking beyond said preselected length of time is prevented.

10. Apparatus for preventing damage to an electric motor during dynamic braking comprising:
    sensing means for electrical detecting dynamic brake current of the electric motor;
    means responsive to said detected dynamic brake current for generating an output whenever said current exceeds a predetermined level; and
    means responsive to the output of said current responsive means for interrupting dynamic braking and substituting mechanical braking therefor whereby damage to the motor by excessive dynamic braking currents may be prevented.

11. Apparatus as recited in claim 10 further including recording means connected with said interrupting means for recording interruptions of said dynamic braking.

12. Apparatus as recited in claim 11 wherein said recording means comprises a counter.

13. Apparatus as recited in claim 10 wherein said current responsive means includes anticiptation circuit means causing the generation of said output whenever the rate of increase of said current is above a predetermined rate and the level thereof is approaching said predetermined level.

14. Apparatus as recited in claim 10 wherein said output is a light signal; and wherein said current responsive means includes a breakdown device coupled to said sensing means, and a source of light; said light source being connected to said breakdown device to generate said light signal in response to operation of said breakdown device whenever said detected dynamic brake current exceeds said predetermined level.

15. Apparatus as recited in claim 14 wherein said interrupting means comprises a light responsive device disposed within optical proximity of said light source, and a semiconductor switch coupled with said light responsive device for assuming a first conductive state in the absence of light from said source and a second conductive state in the presence of light from said source.

16. Apparatus as recited in claim 10 further including:
    second means responsive to said detected dynamic brake current for generating an electrical signal whenever said current exceeds a second predetermined level;

means responsive to mechanical brake pressure exceeding a preset value for assuming an actuated state; and means coupled to said current responsive means and said brake pressure responsive means for generating a second output whenever the electrical signal from said current responsive means and the actuated state of said brake pressure responsive means coexist for more than a preselected length of time;

said interrupting means being further coupled with said second output generating means and being further responsive to said second output whereby simultaneous application of dynamic and mechanical braking beyond said preselected length of time is prevented.

17. Apparatus for preventing wheel locking in an electrically powered vehicle having dynamic and mechanical brake assemblies, comprising:

first electrical detector means adapted to be coupled with the vehicle electric motor for providing a first output in response to motor dynamic brake current exceeding a preset level;

second detector means adapted to be coupled to the mechanical brake assembly for providing a second output in response to brake pressure exceeding a preset level; and means connected to said first and second detectors for causing the interruption of dynamic braking when said first and second outputs coexist for greater than a predetermined length of time.

18. Apparatus as recited in claim 17 further including recording means connected with said interrupting means for recording interruptions of said dynamic braking.

19. Apparatus as recited in claim 18 wherein said recording means comprises a counter.

20. Apparatus as recited in claim 17 wherein said voltage responsive means includes anticipation circuit means causing the generation of said output whenever the rate of increase of said current is above a predetermined rate and the level thereof is approaching said predetermined level.

21. Apparatus as recited in claim 17 wherein said first output is a light signal; and wherein said first electrical detector means includes a breakdown device and a source of light; said light source being connected to said breakdown device to generate said light signal in response to operation of said breakdown device whenever said detected dynamic brake current exceeds said preset level.

22. Apparatus as recited in claim 21 wherein said interrupting means comprises a light responsive device disposed within optical proximity of said light source, and a semiconductor switch coupled with said light responsive device for assuming a first conductive state in the absence of light from said source and a second conductive state in the presence of light from said source.

23. Apparatus as recited in claim 22 wherein said second output is a pressure signal; and wherein said interrupting means further comprises a pressure responsive switch; said pressure responsive switch being coupled between said light responsive device and said semiconductor switch for preventing said semiconductor switch from assuming said second conductive state until said brake pressure exceeds said present level.

24. Apparatus for preventing overcurrent and overvoltage damage to a traction motor and for preventing wheel lockout in an electrically powered rapid transit system having a brake relay and a mechanical brake assembly, comprising:

means adapted to be connected to the brake relay for controlling energization thereof;

first sensing means for electrically detecting dynamic brake voltage of the traction motor and generating an output whenever said dynamic brake voltage exceeds a predetermined voltage value;

first means coupled to said brake relay control means and operatively communicating with said first sensing means for interrupting energization of the brake relay in response to the output of said first sensing means;

second sensing means for electrically detecting dynamic brake current of the traction motor and generating an output whenever said dynamic brake current exceeds a first predetermined current level;

second means coupled to said brake relay control means and operatively communicating with said second sensing means for interrupting energization of the brake relay in response to the output of said second sensing means;

third sensing means for electrically detecting dynamic brake current of the traction motor and generating an output whenever said dynamic brake current exceeds a second predetermined current level;

means adapted to be coupled with the mechanical brake assembly and responsive to mechanical brake pressure exceeding a predetermined value for assuming a particular operative state; and third means coupled to said brake relay control means and said brake pressure responsive means and operatively communicating with said third sensing means for interrupting energization of the brake relay in response to the output of said third sensing means only when said brake pressure responsive means is in said particular operative state;

said first, second and third sensing means being electrically isolated from said first, second and third interrupting means.

25. Apparatus as recited in claim 24 further including first, second and third counters coupled with said first, second and third interrupting means, respectively, for recording interruptions of the energization of the brake relay.

26. Apparatus as recited in claim 24 wherein the outputs of said first, second and third sensing means comprise light signals; and wherein said first, second and third sensing means are in optical communication with said first, second and third interrupting means, respectively.

27. Apparatus for preventing overvoltage and overcurrent damage to a traction motor and for preventing wheel locking in a rapid transit system having a brake relay and a mechanical brake assembly, comprising:

first means for electrically detecting dynamic brake voltage of the traction motor and generating a first output whenever said voltage exceeds a predetermined value;

second means for electrically detecting dynamic brake current of the traction motor and generating a second output whenever said current exceeds a first predetermined level;

third means for electrically detecting dynamic brake current of the traction motor and generating a third output whenever said current exceeds a second predetermined level;

means adapted to be coupled to the mechanical brake assembly and responsive to mechanical brake pressure exceeding a predetermined value for assuming a particular operative state; and circuit means coupled to said first, second and third detecting means and said brake pressure responsive means and adapted to be coupled to the brake relay for interrupting energization of the brake relay and for maintaining the brake relay deenergized for the duration of each braking cycle in response to said first output, said second output or the coincidence of said third output and said brake pressure responsive means assuming said particular operative state;

said circuit means being electrically isolated from said first, second and third detecting means.

* * * * *

REEXAMINATION CERTIFICATE (508th)
United States Patent [19]
Parke et al.

[11] B1 4,074,176
[45] Certificate Issued  May 20, 1986

[54] MOTOR PROTECTOR

[75] Inventors: Harry G. Parke, Brooklyn; Harry W. Tomsky, Bronx, both of N.Y.

[73] Assignee: Marine Electric Corporation, Brooklyn, N.Y.

Reexamination Request:
No. 90/000,778, May 13, 1985

Reexamination Certificate for:
Patent No.: 4,074,176
Issued: Feb. 14, 1978
Appl. No.: 693,483
Filed: Jun. 7, 1976

[51] Int. Cl.⁴ .......................................... H02P 3/26
[52] U.S. Cl. .................................. 318/371; 318/370; 318/87; 303/20
[58] Field of Search .................. 303/3, 15, 16, 20; 318/371, 612, 63, 60, 86, 87, 88, 703, 759, 760, 761, 614, 370, 372, 383

[56] References Cited

U.S. PATENT DOCUMENTS

| | | | |
|---|---|---|---|
| 2,251,132 | 7/1941 | Hines | 303/3 |
| 2,445,680 | 7/1948 | Linhart | 303/3 |
| 2,566,898 | 9/1951 | Lichtenfels et al. | 318/53 |
| 2,627,597 | 2/1953 | Johansson | 318/365 |
| 2,629,058 | 2/1953 | Lillquist | 290/3 |
| 2,637,008 | 4/1953 | Barclay, Jr. | 318/274 |
| 2,653,284 | 9/1953 | Purifoy et al. | 318/56 |
| 2,656,501 | 10/1953 | Cotter | 318/367 |
| 2,666,176 | 1/1954 | Fath | 318/371 X |
| 2,666,877 | 1/1954 | Purifoy | 318/52 |
| 2,802,162 | 8/1957 | Lichtenfels | 318/368 |
| 2,804,585 | 8/1957 | Billante | 318/371 |
| 2,933,350 | 4/1960 | Hines | 303/3 |
| 2,980,036 | 4/1961 | Purifoy | 105/61 |
| 3,038,109 | 6/1962 | Mowery | 318/759 |
| 3,130,358 | 4/1964 | Lang | 318/371 |
| 3,275,380 | 9/1966 | May | 303/3 |
| 3,353,075 | 11/1967 | Torii | 318/57 |
| 3,368,129 | 2/1968 | Chausse et al. | 318/758 |
| 3,439,249 | 4/1969 | Brendemuehl | 318/368 |
| 3,488,570 | 1/1970 | Vint, Jr. et al. | 318/302 |
| 3,525,027 | 8/1970 | Weiser | 318/367 |
| 3,551,771 | 12/1970 | Risberg et al. | 318/302 |
| 3,582,741 | 1/1971 | Arnold | 318/759 |
| 3,621,929 | 11/1971 | Oberthur et al. | 180/65.1 |
| 3,716,274 | 2/1973 | Pier | 303/20 |
| 3,855,512 | 12/1974 | Konrad | 318/366 |
| 3,868,150 | 2/1975 | Maskery | 303/20 |
| 3,869,176 | 3/1975 | Kessler et al. | 303/3 |

FOREIGN PATENT DOCUMENTS

379632 of Japan .

OTHER PUBLICATIONS

GE Motor Control Schematic Drawing TT-8857218.

*Primary Examiner*—Benjamin Dobeck
*Attorney, Agent, or Firm*—Wender, Murase & White

[57] ABSTRACT

Apparatus for preventing overvoltage and overcurrent damage to direct current motors, and wheel lockout in electrically powered vehicles having dynamic and mechanical brake assemblies includes dynamic braking voltage and current sensing circuits, a first network responsive to detected dynamic braking voltages exceeding a predetermined value, a second network responsive to dynamic braking currents exceeding a predetermined level, and a third network responsive to dynamic braking current exceeding a different predetermined level at the same time that excessive mechanical braking occurs and for providing an output when such conditions coexist for more than a predetermined time period, and an interrupting circuit responsive to outputs from the first, second, and third networks for interrupting dynamic braking and substituting therefor mechanical braking.

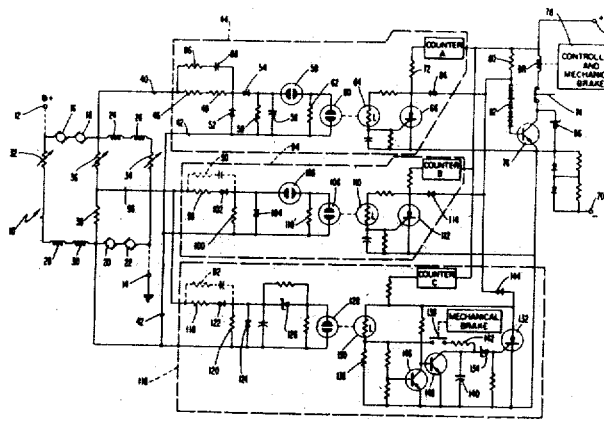

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 50-66:

Referring to the FIGURE, a motor circuit 10 as might be used, for example, in a rapid transit system, is designed to be operated from a source of high power operating potential, represented by positive terminal 12. Source 12 is typically 600 volts DC at several hundred amperes, and is returned to ground at terminal 14. During dynamic braking the motors are disconnected from the power terminals as shown by the dashed lines diagrammatically connecting the motor circuit 10 to terminal 12 and 14. The motor circuit 10 includes four traction motor armatures 16, 18, 20 and 22. When used in a rapid transit system, armatures 16 and 18 may be associated with one [truck] *track* while armatures 20 and 22 are on the other. Field windings 24, 26, 28 and 30 are associated with armatures 16 through 22, respectively, with the armatures and field windings of each associated pair connected in series, as shown.

AS A RESULT OF REEXAMINATION, IT HAS BEEN DETERMINED THAT:

The patentability of claims 17-27 is confirmed.

Claims 1, 2, 4, 5, 7, 9-11, 13, 14 and 16 are determined to be patentable as amended.

Claims 3, 6, 8, 12 and 15, dependent on an amended claim, are determined to be patentable.

New claims 28-31 are added and determined to be patentable.

1. *In combination with an electric motor having a primary dynamic braking voltage controller for preventing excessive dynamic brake voltage during dynamic braking, the improvement comprising:*
   [Apparatus] *an apparatus* for preventing damage to [an] *the* electric motor during dynamic braking comprising:
   sensing means, *functionally independent of said primary voltage controller* for electrically detecting *the* dynamic brake voltage of the electric motor;
   means responsive to said detected dynamic brake voltage for generating an output whenever said voltage exceeds a predetermined value; and
   means responsive to the output of said voltage responsive means for interrupting dynamic braking and substituting mechanical braking therefor whereby damage to the motor [by] *from* excessive dynamic braking voltages may be prevented *when said primary voltage controller fails to limit the dynamic brake voltage to said predetermined level.*

2. *Apparatus for preventing damage to an electric motor during dynamic braking comprising:*
   *sensing means for electrically detecting dynamic brake voltage of the electric motor;*
   *means responsive to said detected dynamic brake voltage for generating an output whenever said voltage exceeds a predetermined value;*
   *means responsive to the output of said voltage responsive means for interrupting dynamic braking and substituting mechanical braking therefor whereby damage to the motor by excessive dynamic braking voltages may be prevented; and* [Apparatus as recited in claim 1 further including]
   *a* recording means connected with said interrupting means for recording interruptions of said dynamic braking.

4. *Apparatus for preventing damage to an electric motor during dynamic braking comprising:*
   *sensing means for electrically detecting dynamic brake voltage of the electric motor;*
   *means responsive to said detected dynamic brake voltage for generating an output whenever said voltage exceeds a predetermined value;*
   *means responsive to the output of said voltage responsive means for interrupting dynamic braking and substituting mechanical braking therefor whereby damage to the motor by excessive dynamic braking voltages may be prevented; and* [Apparatus as recited in claim 1] wherein said voltage responsive means includes *an* anticipation circuit means *for* causing the generation of said output whenever the rate of increase of said voltage is above a predetermined rate and the value thereof is approaching said predetermined value.

5. *Apparatus for preventing damage to an electric motor during dynamic braking comprising:*
   *sensing means for electrically detecting dynamic brake voltage of the electric motor;*
   *means responsive to said detected dynamic brake voltage for generating an output whenever said voltage exceeds a predetermined value;*
   *means responsive to the output of said voltage responsive means for interrupting dynamic braking and substituting mechanical braking therefor whereby damage to the motor by excessive dynamic braking voltages may be prevented; and* [Apparatus as recited in claim 1] wherein said output is a light signal; and wherein said voltage responsive means comprises a voltage breakdown device coupled to said sensing means, and a source of light; said light source being connected to said voltage breakdown device to generate said light signal in response to operation of said voltage breakdown device whenever said detected dynamic brake voltage exceeds said predetermined value.

7. *Apparatus for preventing damage to an electric motor during dynamic braking comprising:*
   *sensing means for electrically detecting dynamic brake voltage of the electric motor;*
   *means responsive to said detected dynamic brake voltage for generating an output whenever said voltage exceeds a predetermined value;*
   *means responsive to the output of said voltage responsive means for interrupting dynamic braking and substituting mechanical braking therefor whereby damage to the motor by excessive dynamic braking voltages*

*may be prevented;* [Apparatus as recited in claim 1 further including:]

a second sensing means for electrically detecting dynamic brake current of the electric motor; and means responsive to said detected dynamic brake current for generating a second output whenever said current exceeds a predetermined level;

said interrupting means being further coupled with said current responsive means and responsive to said second output for interrupting dynamic braking and substituting mechanical braking therefor.

9. *Apparatus for preventing damage to an electric motor during dynamic braking comprising:*

*sensing means for electrically detecting dynamic brake voltage of the electric motor;*

*means responsive to said detected dynamic brake voltage for generating an output whenever said voltage exceeds a predetermined value;*

*means responsive to the output of said voltage responsive means for interrupting dynamic braking and substituting mechanical braking therefor whereby damage to the motor by excessive dynamic braking voltages may be prevented;* [Apparatus as recited in claim 1 further including:]

a second sensing means for electrically detecting dynamic brake current of the electric motor;

means responsive to said detected dynamic brake current for generating an electrical signal whenever said current exceeds a predetermined level;

means responsive to mechanical brake pressure exceeding a preset value for assuming an actuated state; and means coupled to said current responsive means and said brake pressure responsive means for generating a second output whenever the electrical signal from said current responsive means and the actuated state of said brake pressure responsive means coexist for more than a preselected length of time;

said interrupting means being further coupled with said second output generating means and being further responsive to said second output whereby simultaneous application of dynamic and mechanical braking beyond said preselected length of time is prevented.

10. *In combination with an electric motor having a primary dynamic braking current controller for preventing excessive dynamic brake currents during dynamic braking, the improvement comprising:* [Apparatus]

an apparatus for preventing damage to [an] *the* electric motor during dynamic braking comprising:

sensing means, *functionally independent of said primary current controller* for [electrical] *electrically* detecting *the* dynamic brake current of the electric motor;

means responsive to said detected dynamic brake current for generating an output whenever said current exceeds a predetermined level; and means responsive to the output of said current responsive means for interrupting dynamic braking and substituting mechanical braking therefor whereby damage to the motor [by] *from* excessive dynamic [braking] *brake* currents may be prevented *when said primary current controller fails to limit the dynamic brake current to said predetermined level.*

11. *In combination with an electric motor having a primary dynamic braking current controller for preventing excessive dynamic brake currents during dynamic braking, the improvement comprising:* an apparatus for preventing damage to the electric motor during dynamic braking comprising:

sensing means, functionally independent of said primary current controller, for electrically detecting the dynamic brake current of the electric motor;

means responsive to said detected dynamic brake current for generating an output whenever said current exceeds a predetermined level;

means responsive to the output of said current responsive means for interrupting dynamic braking and substituting mechanical braking therefor whereby damage to the motor from excessive dynamic brake currents may be prevented when said primary current controller fails to limit the dynamic brake current to said predetermined level; and [Apparatus as recited in claim 10 further including]

a recording means connected with said interrupting means for recording interruptions of said dynamic braking.

13. *In combination with an electric motor having a primary dynamic braking current controller for preventing excessive dynamic brake currents during dynamic braking, the improvement comprising:* an apparatus for preventing damage to the electric motor during dynamic braking comprising:

sensing means, functionally independent of said primary current controller, for electrically detecting the dynamic brake current of the electric motor;

means responsive to said detected dynamic brake current for generating an output whenever said current exceeds a predetermined level;

means responsive to the output of said current responsive means for interrupting dynamic braking and substituting mechanical braking therefor whereby damage to the motor from excessive dynamic brake currents may be prevented when said primary current controller fails to limit the dynamic brake current to said predetermined level; and [Apparatus as recited in claim 10]

wherein said current responsive means includes *an* [anticiptation] *anticipation* circuit means *for* causing the generation of said output whenever the rate of increase of said current is above a predetermined rate and the level thereof is approaching said predetermined level.

14. *In combination with an electric motor having a primary dynamic braking current controller for preventing excessive dynamic brake currents during dynamic braking, the improvement comprising:* an apparatus for preventing damage to the electric motor during dynamic braking comprising:

sensing means, functionally independent of said primary current controller, for electrically detecting the dynamic brake current of the electric motor;

means responsive to said detected dynamic brake current for generating an output whenever said current exceeds a predetermined level;

means responsive to the output of said current responsive means for interrupting dynamic braking and substituting mechanical braking therefor whereby damage to the motor from excessive dynamic brake currents may be prevented when said primary current controller fails to limit the dynamic brake current to said predetermined level; and [Apparatus as recited in claim 10]

wherein said output is a light signal; and wherein said current responsive means includes a breakdown device coupled to said sensing means, and a source of light; said light source being connected to said breakdown device to generate said light signal in response to operation of said breakdown device whenever said detected dynamic brake current exceeds said predetermined level.

16. In combination with an electric motor having a primary dynamic current controller for preventing excessive dynamic brake currents during dynamic braking, the improvement comprising:
an apparatus for preventing damage to the electric motor during dynamic braking comprising:
sensing means, functionally independent of said primary current controller, for electrically detecting the dynamic brake current of the electric motor;
means responsive to said detected dynamic brake current for generating an output whenever said current exceeds a predetermined level;
means responsive to the output of said current responsive means for interrupting dynamic braking and substituting mechanical braking therefor whereby damage to the motor from excessive dynamic brake currents may be prevented when said primary current controller fails to limit the dynamic brake current to said predetermined level; [Apparatus as recited in claim 10 further including:]
a second means responsive to said detected dynamic brake current for generating an electrical signal whenever said current exceeds a second predetermined level;
means responsive to mechanical brake pressure exceeding a preset value for assuming an actuated state; and
means coupled to said current responsive means and said brake pressure responsive means for generating a second output whenever the electrical signal from said current responsive means and the actuated state of said brake pressure responsive means coexist for more than a preselected length of time;
said interrupting means being further coupled with said second output generating means and being further responsive to said second output whereby simultaneous application of dynamic and mechanical braking beyond said preselected length of time is prevented.

28. Apparatus for preventing damage to an electric motor during dynamic braking comprising:
sensing means for electrically detecting a dynamic brake current of the electric motor;
means responsive to said detected dynamic brake current for generating an output whenever said current exceeds a predetermined level;
means responsive to the output of said current responsive means for interrupting dynamic braking and substituting mechanical braking therefor whereby damage to the motor from excessive dynamic brake currents may be prevented; and
recording means connected with said interrupting means for recording interruptions of said dynamic braking.

29. In combination with an electric motor having a primary dynamic braking current controller, an apparatus for preventing damage to the electric motor during dynamic braking comprising:
sensing means for electrically detecting a dynamic brake current of the electric motor;
means responsive to said detected dynamic brake current for generating an output whenever said current exceeds a predetermined level;
means responsive to the output of said current responsive means for interrupting dynamic braking and substituting mechanical braking therefor whereby damage to the motor from excessive dynamic brake currents may be prevented when the primary current controller fails to limit the current to said predetermined level, said current responsive means including anticipation circuit means operable for causing the generation of said output whenever the rate of increase of said current is above a predetermined rate and the level thereof is approaching said predetermined level.

30. In combination with an electric motor having a primary dynamic braking current controller, an apparatus for preventing damage to an electric motor during dynamic braking comprising:
sensing means for electrically detecting a dynamic brake current of the electric motor;
means responsive to said detected dynamic brake current for generating an output whenever said current exceeds a predetermined level;
means responsive to the output of said current responsive means for interrupting dynamic braking and substituting mechanical braking therefor whereby damage to the motor from excessive dynamic brake currents may be prevented, wherein said current responsive means including a breakdown device coupled to said sensing means, and a source of light; said light source being connected to said breakdown device to generate said light signal in response to operation of said breakdown device whenever said detected dynamic brake current exceeds said predetermined level.

31. In combination with an electric motor having a primary dynamic braking current controller, an apparatus for preventing damage to the electric motor during dynamic braking comprising:
sensing means for electrically detecting a dynamic brake current of the electric motor;
means responsive to said detected dynamic brake current for generating an output whenever said current exceeds a predetermined level;
means responsive to the output of said current responsive means for interrupting dynamic braking and substituting mechanical braking therefore whereby damage to the motor from excessive dynamic brake currents may be prevented;
second means responsive to said detected dynamic brake current for generating an electrical signal whenever said current exceeds a second predetermined level;
means responsive to mechanical brake pressure exceeding a preset value for assuming an actuated state; and
means coupled to said current responsive means and said brake pressure responsive means for generating a second output whenever the electrical signal from said current responsive means and the actuated state of said brake pressure responsive means coexist for more than a preselected length of time;
said interrupting means being further coupled with said second output generating means and being further responsive to said second output whereby simultaneous application of dynamic and mechanical braking beyond said preselected length of time is prevented.

* * * * *